Nov. 11, 1969 L. N. WILDER 3,477,532
CANTILEVER BEAM SCALE WITH REDUCED CROSS SECTIONS
FOR STRAIN GAUGE ATTACHMENT
Filed March 16, 1967

INVENTOR.
LESLIE N. WILDER
BY
ATTORNEYS

United States Patent Office 3,477,532
Patented Nov. 11, 1969

3,477,532
CANTILEVER BEAM SCALE WITH REDUCED CROSS SECTIONS FOR STRAIN GAUGE ATTACHMENT
Leslie N. Wilder, New Rochelle, N.Y., assignor to Icore Industries, a corporation of California
Filed Mar. 16, 1967, Ser. No. 623,618
Int. Cl. G01g 3/14
U.S. Cl. 177—211                    2 Claims

ABSTRACT OF THE DISCLOSURE

A weighing cell of the type wherein the weight is measured by the amount of deflection of a beam wherein measurements of the deflection are made at two different places along the beam whereby the bending moment produces a difference reading representing the true weight of the item being weighed, independent of the position of the item on the pan of the scale.

BACKGROUND OF THE INVENTION

Field of the invention

Weighing cells wherein weight is determined by the amount of deflection of a beam.

Description of prior art

Heretofore a single measurement was made of the deflection of the beam and this measurement could be inaccurate because of changes in the amount of deflection depending upon the placement of the article on the pan of the scale.

SUMMARY OF THE INVENTION

In scales wherein a beam is deflected and the weight is determined by the amount of deflection, a difficulty arises if the weighing pan is affixed to the beam in that the scale will be sensitive to the position of the weight on the pan. In other words, if the weight on the scale is at a point furthest from the point of attachment of the beam, a greater bending moment will result than should the same weight be closer to the point of attachment.

In accordance with the present invention, a simple compensating means is provided so that a scale can be constructed with the pan rigidly affixed to the beam, or the beam itself used as a pan, yet the position of the weight on the pan will be automatically cancelled out so that the scale will be completely independent of the position of the weight on the scale. This is particularly important in high speed scales wherein the article to be weighed is not deposited on the scale pan but rather is propelled across the scale pan by means of a belt at a relatively high rate of speed so that the article is in different positions on the pan during the weighing operation.

In general the objects of the present invention are achieved by providing a beam wherein the bending moment is measured at two spaced points on the beam and by subtracting one reading from the other. Thus, one obtains a quantity which is independent of the position of the weight on the pan and is dependent only upon the difference in bending moment of the two measured points. It is thus the distance between the two points which is a factor in determining the ultimate reading and not the distance from the point of attachment of the beam to the position of the weight.

DESCRIPTION OF THE PREFERRED EMBODIMENTS

Figure 1:
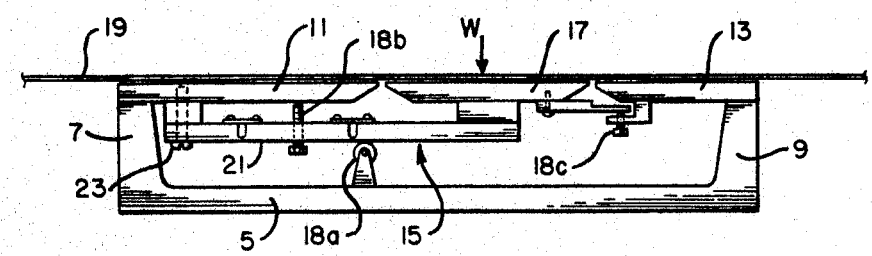
FIGURE 1 is a side view of a scale embodying the present invention.
Figure 2:
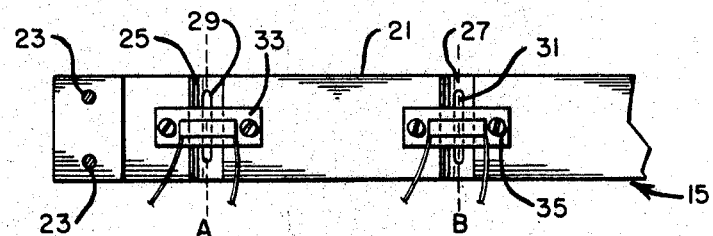
FIGURE 2 is an enlarged plan view of a portion of the beam.
Figure 3:
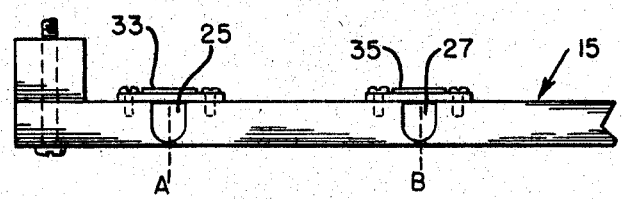
FIGURE 3 is a side view of the beam shown in FIGURE 2.

Turning now to a description of the drawings by reference characters, there is shown a scale having a frame member 5 having pillars 7 and 9 at each end thereof which support fixed platforms 11 and 13. Platform 11 also provides support for the scale beam generally designated 15 having a pan 17 near one end thereof. As can be seen from the drawings, the scale pan 17 forms a smooth continuation of the platforms 11 and 13. In the embodiment shown, an endless belt 19 is provided which moves over the platform and the scale pan carrying articles to be weighed. Overload and protective stops 18a, b, c may be provided as shown.

The beam, generally designated 15, comprises an elongated member 21 having studs 23 for attaching the beam to the fixed platform 11. In the embodiment of the invention illustrated, the beam has notches 25 and 27 and slots 29 and 31 to secure proper sensitivity for a given combination of beam, load and transducer. However, weakening of the beam is not essential to the operation of the invention.

In the embodiment of the invention illustrated, in order to measure the bending moment at cross section A, a first strain gauge 33 is secured over the notch 25 while a second strain gauge 35 is secured over the notch 27 (cross section B). Such gauges are well-known to those skilled in the art and consist of elements which change in electrical resistance under tension or compression.

It will be apparent from the above that if a weight is placed on the pan 17, both strain gauges will de deflected and that the amount of the deflections will depend on the position of the weight in pan 17. Thus, if the weight is placed at a point remote from the attachment point 23 greater deflections will be secured than if the weight is moved to a position nearer the attachment point 23. However, the difference in bending moments between the two cross sections will be found to be a constant depending upon the amount of weight placed on the pan and the distance between the cross sections and is completely independent of the position of the weight on the pan.

Figure 4:
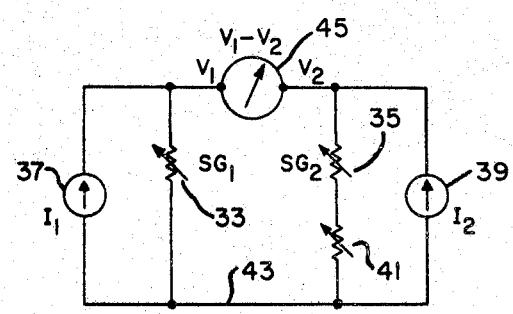
FIGURE 4 is a schematic diagram of a suitable circuit for detecting the difference in deflection of the two points on the beam.

FIGURE 4 illustrates schematically one suitable circuit for measuring the difference in bending moments of the two points of the beam. In this circuit, equal constant current sources 37 and 39 are provided which are placed in series with the strain gauges 33 and 35 respectively. In addition, a trim resistor 41 may be provided in either or both circuits to compensate for variations in the strain gauges. The two circuits are connected together at 43 while at the opposite points in the circuits the circuits are connected through a meter 45. It will be apparent that in this circuit, if the resistance 33 and 35+41 are equal, no current will flow through the meter 45. Further if the resistances are varied in equal amounts, there will still be no deflection of the meter. However, if one resistance is increased more than the other, current will then flow through the interconnecting circuit causing a deflection on the meter 45 and this deflection will be proportional to the difference in readings of the two strain gauges.

A Wheatstone bridge is another suitable circuit for this application but does not provide as large an output for given resistance changes.

In the above description of the invention, it has been assumed that strain gauges are employed for measuring the bending moment of the beam at two different points. However, this is given as a convenient method for measuring the bending moment but it is within the scope of this invention to measure such bending moment in other manners such as by purely mechanical means.

It is believed apparent from the foregoing that I have provided an improved form of scale mechanism utilizing a beam as the weight sensitive element and wherein the scale reading is completely independent of the position of the weight on the pan.

I claim:
1. In a scale,
 (a) a flexible beam,
 (b) means for anchoring said beam adjacent one end thereof,
 (c) a weighing area at a point remote from the point of attachment of the beam,
 (d) said beam having a reduced cross sectional area at two spaced points between said point of attachment and said weighing area,
 (e) an electrical strain gauge bridging each of the two said points of reduced area, and
 (f) an electrical circuit attached to each of the strain gauges for detecting the difference in bending moment at the two areas of reduced cross sectional area.

2. The scale of claim 1 having a flexible belt passing over the weighing pan for conveying articles thereover.

References Cited

UNITED STATES PATENTS

| 2,597,751 | 5/1952 | Ruge | 177—211 X |
| 3,063,576 | 11/1962 | Hofmeister. | |
| 3,168,153 | 2/1965 | Dinter et al. | 177—211 X |
| 3,356,170 | 12/1967 | Cory et al. | 177—211 X |

FOREIGN PATENTS 859,630   1/1961   Great Britain.

RICHARD B. WILKINSON, Primary Examiner

G. H. MILLER, Jr., Assistant Examiner